United States Patent
Khan

(10) Patent No.: US 12,348,603 B2
(45) Date of Patent: Jul. 1, 2025

(54) METADATA PRIORITIZATION

(71) Applicant: Cisco Technology, Inc., San Jose, CA (US)

(72) Inventor: Amir Khan, Karnataka (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 533 days.

(21) Appl. No.: 17/681,381

(22) Filed: Feb. 25, 2022

(65) Prior Publication Data

US 2023/0224382 A1  Jul. 13, 2023

(30) Foreign Application Priority Data

Jan. 13, 2022  (IN) .............................. 202241002045

(51) Int. Cl.
| H04L 69/22 | (2022.01) |
| H04L 47/24 | (2022.01) |
| H04L 47/2425 | (2022.01) |
| H04L 47/2441 | (2022.01) |

(52) U.S. Cl.
CPC .......... *H04L 69/22* (2013.01); *H04L 47/2433* (2013.01); *H04L 47/2441* (2013.01); *H04L 47/2458* (2013.01)

(58) Field of Classification Search
CPC ....................................................... H04L 69/22
See application file for complete search history.

(56) References Cited

U.S. PATENT DOCUMENTS

| 2012/0321273 A1* | 12/2012 | Messmer ............. H04N 9/8205 |
| | | 386/E5.028 |
| 2019/0104075 A1* | 4/2019 | Li ........................... H04L 47/32 |
| 2019/0141168 A1 | 5/2019 | Bhandari et al. |
| 2020/0137563 A1* | 4/2020 | Bhattacharyya ...... H04W 24/10 |
| 2021/0084530 A1* | 3/2021 | Song ....................... H04L 69/22 |
| 2022/0158663 A1* | 5/2022 | Hassan ................ H04B 1/0003 |

(Continued)

FOREIGN PATENT DOCUMENTS

| CN | 110213129 A | 9/2019 |
| WO | 2020125650 A1 | 6/2020 |
| WO | 2021174236 A2 | 9/2021 |

OTHER PUBLICATIONS

Alvarez et al., "In-band Network Telemetry (INT) Dataplane Specification," In-band Network Telemetry, Version 2.1, Nov. 11, 2020, 56 pages.

(Continued)

*Primary Examiner* — Jason E Mattis
(74) *Attorney, Agent, or Firm* — Edell, Shapiro & Finnan, LLC

(57) ABSTRACT

Methods are provided to categorize and filter node metadata by adding a priority field to the node metadata, obtained as part of in-band network telemetry data collection. The methods involve obtaining, by a first network device, a packet having a header and a payload and adding, by the first network device, to the header of the packet, metadata which includes first telemetry data and a metadata priority level that indicates a priority of the first telemetry data added to the header of the packet by the first network device. The methods further involve providing the packet to a second network device in a path of a network.

20 Claims, 9 Drawing Sheets

(56) References Cited

U.S. PATENT DOCUMENTS

2022/0407814 A1* 12/2022 Kadosh ................ H04L 43/106

OTHER PUBLICATIONS

F. Brockners, et al., "Data Fields for In-situ OAM draft-ietf-ippm-ioam-data-09," ippm, Internet-Draft, Intended status: Standards Track, Mar. 8, 2020, 43 pages.

Tal Mizrahi, et al., "Network Telemetry Solutions for Data Center and Enterprise Networks," Marvell, White Paper, Mar. 2018, 14 pages.

F. Brockners, et al., "Data Fields for In-situ OAM draft-ietf-ippm-ioam-data-02," ppm, Internet-Draft, Intended status: Standards Track, Mar. 5, 2018, 34 pages.

* cited by examiner

METADATA PRIORITIZATION

CROSS-REFERENCE TO RELATED APPLICATION

This application claims the benefit of foreign priority under 35 U.S.C. § 119 to Indian Provisional Patent Application Serial No. 202241002045, entitled "METADATA PRIORITIZATION," filed on Jan. 13, 2022, which is hereby incorporated by reference in its entirety.

TECHNICAL FIELD

The present disclosure generally relates to data and communication networks.

BACKGROUND

Services provided to an enterprise often traverse multiple networks and/or are provided in a cloud. Tracking performance and failure troubleshooting in these networks can be a complex task that involves gathering and analyzing telemetry data from various nodes along a network path. For example, In-band Network Telemetry (INT) defined by P4 Applications Working Group of the Open Networking Foundation (ONF) and In-Situ Operation, Administration and Maintenance (IOAM) defined by the Internet Engineering Task Force (IETF) provide mechanisms for collecting telemetry data from various network nodes along a path in a network.

DESCRIPTION OF EXAMPLE EMBODIMENTS

Overview

Figure 1:
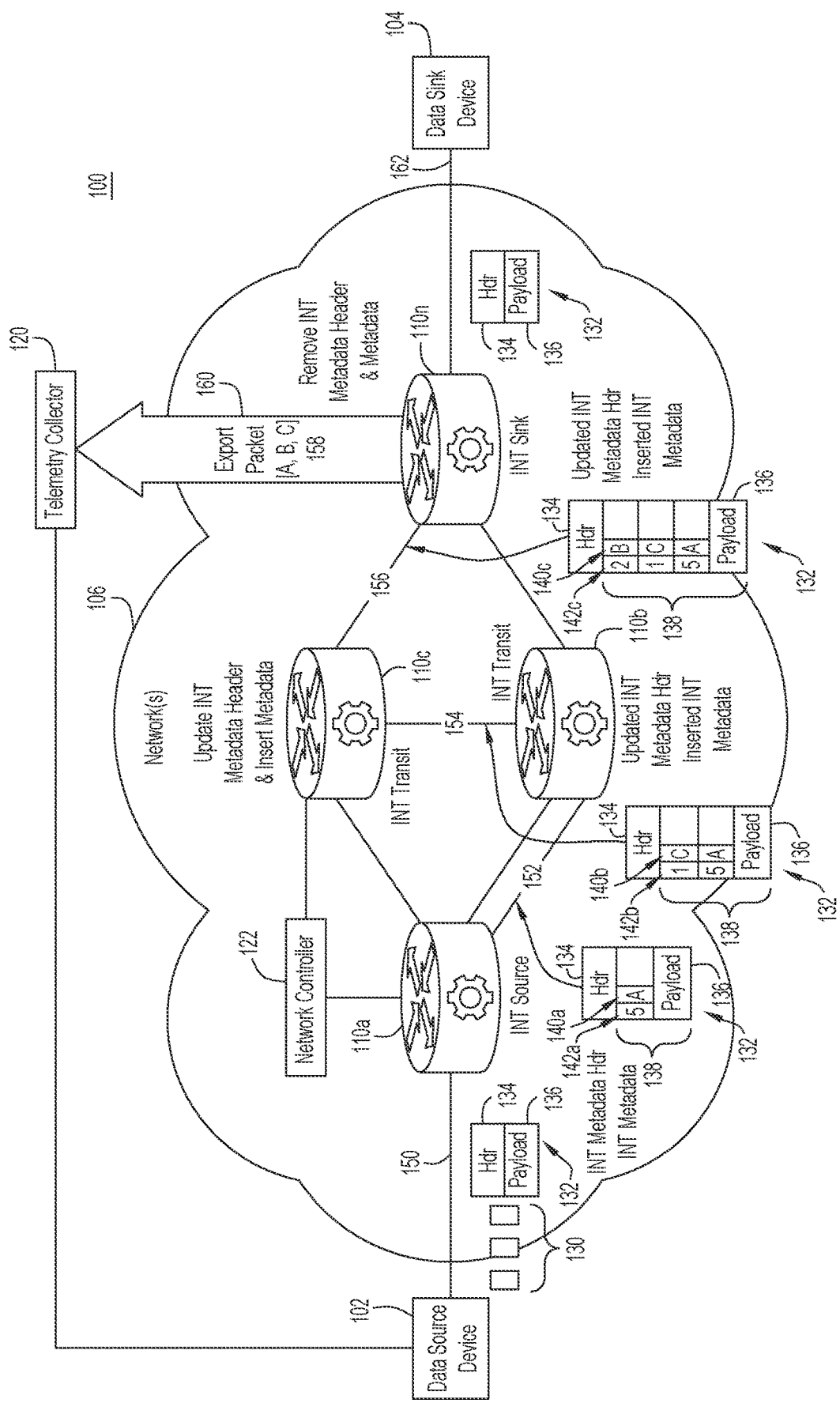
FIG. 1 is a block diagram illustrating a system in which metadata prioritization is deployed, according to an example embodiment.

A mechanism is presented herein to categorize and filter node metadata by adding a priority field to the node metadata, obtained as part of in-band network telemetry data collection.

In one form, a first network device obtains a packet having a header and a payload, and adds to the header of the packet, metadata which includes first telemetry data and a metadata priority level that indicates a priority of the first telemetry data added to the header of the packet by the first network device. The first network device also provides the packet to a second network device in a path of a network.

In other form, a network device obtains a packet having a payload and a header that includes aggregated metadata obtained from a plurality of network nodes traversed by the packet and extracts, from the aggregated metadata, a plurality of metadata priority levels associated with telemetry data sets included in the aggregated metadata. The network device also reorders the telemetry data sets based on metadata priority levels of respective telemetry data sets to produce reordered telemetry data and exports, to a destination device, the reordered telemetry data.

EXAMPLE EMBODIMENTS

Tracking performance and troubleshooting often involves tracing performance along a path in one or more networks. For example, the aforementioned IOAM or INT standards use space in a packet to collect various telemetry data or information at each hop the packet travels in the network(s). That is, telemetry data, sometimes called "collection data" or "measurement data", are values obtained from monitoring i.e., monitoring by network devices performance of a network. The telemetry data includes various information such as identifiers, timestamps, interfaces visited, queue depth etc., for each network device the packet traverses along the path. A network sink device (last network node along the path in the network such as INT-Sink device or decapsulating node) extracts the gathered telemetry data (in a form of metadata) from the received network packet and generates an export packet that includes the gathered metadata. The generated export packet is transmitted to a telemetry collector for analyzing the metadata to determine performance related issues and/or to perform troubleshooting. Based on analyzing the metadata, one or more network devices may be reconfigured e.g., to gather additional telemetry data, to change a network device setting, etc.

In-band network data collection standards, such as INT and IOAM, do not have a mechanism to signal to the telemetry collector that a particular telemetry data set of a particular network device is more critical or important and needs to be processed on a priority basis with respect to other telemetry data sets of other network devices. When the network sink device generates the export packet based on the extracted node metadata from the incoming packet, it maintains the order in which the node metadata were added and directly adds them to the export packet in that the same order, and sends the export packet to the telemetry collector. Since the metadata is in the order of collection, a network device that may require immediate attention needs to wait until its metadata is processed by the telemetry collector.

In one or more example embodiments, techniques are provided to categorize and filter metadata by adding a metadata priority field therein, obtained as part of in-band network telemetry data collection. That is, the techniques include generating and adding a metadata priority level field to the metadata e.g., using an unused bit of the INT metadata or IOAM metadata, to signal priority level of the metadata (a metadata priority level). Based on the signaled metadata priority level, the network sink device reorders the metadata based on the respective metadata priority levels and exports the metadata, reordered based on the metadata priority levels, to the telemetry collector. As a result, the telemetry data set associated with a network device that is in need of the telemetry collector's attention in a timely manner is processed faster than other telemetry data sets of other network devices. If the metadata is not be reordered in this manner, then there is a delay before the network device that needs the attention can be attended to and this delay depends on how deep the telemetry data set is in the export packet stack. In one or more example embodiments, the telemetry data set of this network device is prioritized for improved performance monitoring and/or troubleshooting. As such, needed reconfiguration of the network device is expedited without the processing delay associated with telemetry data collection.

FIG. 1 is a block diagram illustrating a system 100 in which metadata prioritization is deployed, according to an example embodiment.

In FIG. 1, the system 100 includes a data source device 102, a data sink device 104, a plurality of network devices 110a-n that transport packet flows from the data source device 102 to the data sink device 104 across one or more network(s) 106, a telemetry collector 120, and a network controller 122. This is only an example of the system 100, and the number and types of entities may vary based on a particular deployment and use case scenario, such as the type of service being provided and network structures of various network(s) 106.

In various example embodiments, the entities of the system 100 (the data source device 102, the data sink device 104, the plurality of network devices 110a-n, the telemetry collector 120, and the network controller 122) may each include a network interface, at least one processor, and a memory. Each entity may be any programmable electronic device capable of executing computer readable program instructions. The network interface may include one or more network interface cards (having one or more ports) that enable components of the entity to send and receive data over the network(s) 106. Each entity may include internal and external hardware components such as those depicted and described in further detail in FIG. 8. In one example, at least some of these entities may be embodied as virtual devices with functionality distributed over a number of hardware devices such as virtual switches, routers, etc.

The data source device 102 and the data sink device 104 may be a computer or client device or an endpoint that generates data based on input from an operator or may be a service running on a server that responds to requests or performs actions based on the requests.

The plurality of network devices 110a-n are transport nodes that include a network source device 110a (e.g., an INT source), first and second intermediate network devices 110b and 110c (transit nodes), and a network sink device 110n (e.g., an INT sink). The network devices 110a-n may include, but are not limited to switches, virtual routers, leaf nodes, spine nodes, etc. The network devices 110a-n include a central processing unit (CPU), a memory, a packet processing logic, an ingress interface, an egress interface, one or more buffers for storing various packets of various traffic flows, and one or more interface queues such as those depicted and described below. The notation "a-n" denotes that a number is not limited, can vary widely, and depends on a particular use case scenario.

The telemetry collector 120 may be a network analysis entity or a software application that stores and analyzes telemetry data to assess network performance or to perform a troubleshooting task. The telemetry collector 120 may simply process and store the telemetry data for analysis by a different device. For example, the telemetry collector 120 may provide the telemetry data to the network controller 122. The network controller 122 may then analyze the telemetry data and configure one or more of the network devices 110a-n in the network(s) 106 based on this analysis. In one example embodiment, the telemetry collector 120 and the network controller 122 are integrated into a single device that analyzes the metadata and controls the network devices 110a-n based on the analyzed metadata and rules or policies for the network(s) 106.

A traffic flow 130 includes a plurality of packets. A packet 132 includes a header (Hdr) 134 and a payload 136 that carries data such as commands, instructions, responses, information, etc. As the packet 132 traverses along the path through the network(s) 106, telemetry data is added as aggregated metadata (metadata) 138 to the header 134. The telemetry data collected along the path may include one or more of: (1) network device related information such as switch level information (switch identifier), (2) ingress related information such as ingress interface identifier and/or ingress timestamp(s), (3) egress related information such as egress interface identifier, egress timestamp(s), hop latency, egress port transmission link utilization, (4) buffer related information such as queue occupancy level as experienced by the network packet 132, running average occupancy level, etc. In the system 100, the aggregated metadata 138 may be collected as follows.

At 150, the data source device 102 generates the traffic flow 130. Each packet 132 of the traffic flow 130 is transmitted to the network(s) 106 and is received by the network source device 110a. Each packet 132 includes the header 134 with a destination address or identifier, instructions for collecting telemetry data, etc. and the payload 136 carrying data intended for the data sink device 104 (destination).

The network source device 110a analyzes the header 134 of the packet 132 to determine the next hop, types of telemetry data to collect, and whether to set a metadata priority level. The network source device 110a adds or inserts its telemetry data set (A) shown at reference numeral 140a and a respective metadata priority level (denoted "5") shown at reference numeral 142a to the aggregated metadata 138 based on the instructions obtained from the header 134. At 152, the network source device 110a transmits the packet 132 to the next hop such as the first intermediate network device 110b.

The first intermediate network device 110b similarly analyzes the header 134 of the packet 132 to determine the next hop, which telemetry data to collect, and whether to set a metadata priority level based on the instructions therein. The first intermediate network device 110b adds or inserts its respective telemetry data set (C) shown at reference numeral 140b and the respective metadata priority level (denoted "1") shown at reference numeral 142b to the aggregated metadata 138. At 154, the first intermediate network device 110b transmits the packet 132 to the next hop such as the second intermediate device 110c.

The second intermediate device 110c also examines the header 134 of the packet 132 to determine the next hop, telemetry data to collect, and whether to set a metadata priority level based on the instructions therein. The second intermediate device 110c also adds its respective telemetry data set (B) shown at reference numeral 140c and the respective metadata priority level (denoted "2") shown at reference numeral 142c, to the aggregated metadata 138. At 156, the second intermediate device 110c transmits the packet 132 to the network sink device 110n.

At this point, the aggregated metadata 138 includes the last/most recently collected telemetry data set (B) 140c, second telemetry data set (C) 140b, and the first collected telemetry data set (A) 140a. The telemetry data sets 140a, 140b, and 140c are in the order of collection. The network sink device 110n reorders the telemetry data sets 140a, 140b, and 140c based on the respective metadata priority information or levels 142a, 142b, and 142c and generates an export packet 158 with the reordered telemetry data sets (the telemetry data set (A) 140a with priority level 5, followed by the telemetry data set (B) 140c with priority level 2, and then followed by the telemetry data set (C) 140b with priority level 1). In other words, the first collected telemetry data set (A) 140a that has the highest priority is now the first telemetry data set in the aggregated metadata 138 so that the telemetry collector 120 analyzes it first. At 160, the network sink device 110n transmits the export packet 158 to the telemetry collector 120. The aggregated metadata 138 is removed from the packet 132 and the packet 132 is transmitted to the data sink device 104, at 162.

In one or more example embodiments, at each of the network devices 110a-110n along a network path, the telemetry data sets 140a-140c are added to the aggregated metadata 138 with an additional new metadata field including the metadata priority levels 142a, 142b, and 142c that are generated and added by each of the network devices 110a-n along the telemetry path. In yet another example embodiment, the telemetry data sets 140a, 140b, and 140c may be provided with the metadata priority information 142a, 142b, and 142c, respectively, so that the telemetry collector 120 processes the metadata based on the metadata priority information 142a, 142b, and 142c instead of processing them according to their order in the export packet 158.

For example, the aggregated metadata 138 includes a first telemetry data set added by a first network node of the plurality of network nodes and a corresponding first metadata priority level set by the first network node and a second telemetry data set added by a second network node of the plurality of network nodes and a corresponding second metadata priority level set by the second network node. When the network sink device 110n determines that the corresponding second metadata priority level is higher than the corresponding first metadata priority level, the network sink device 110n generates the export packet 158 in which the second telemetry data set is sequentially ordered before the first telemetry data set.

Figure 2A:
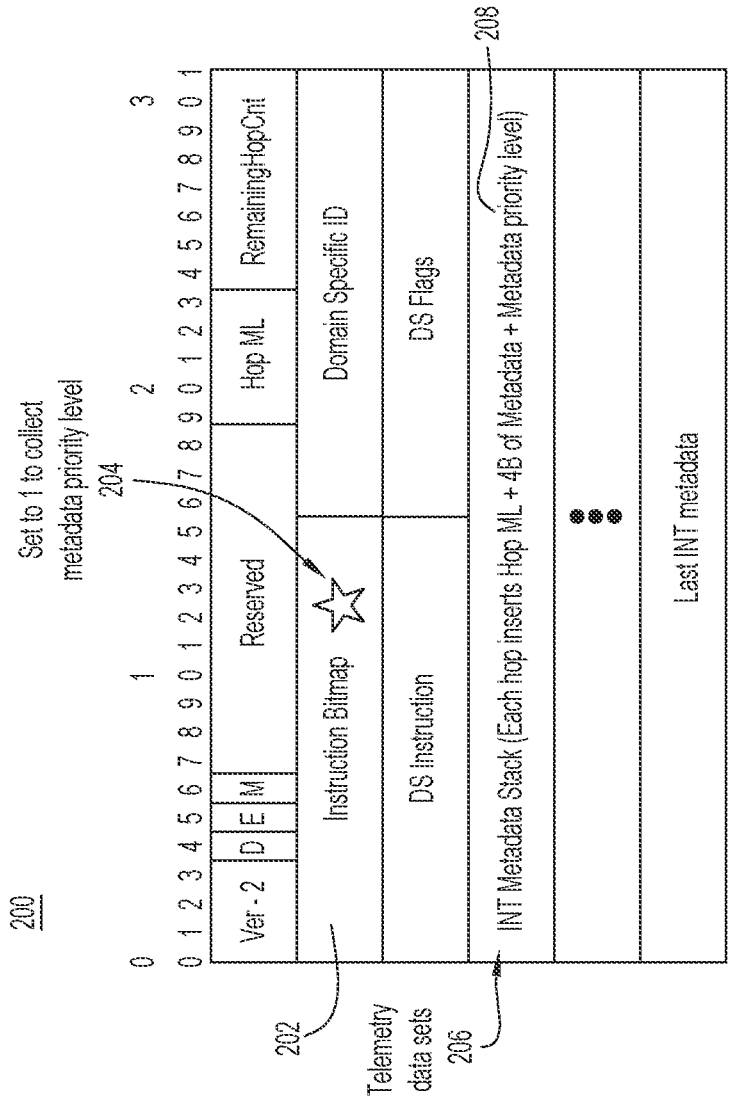
FIGS. 2A and 2B are diagrams illustrating instructions stored in a header of a packet for indicating whether to set metadata priority level, according to example embodiments.
Figure 2B:
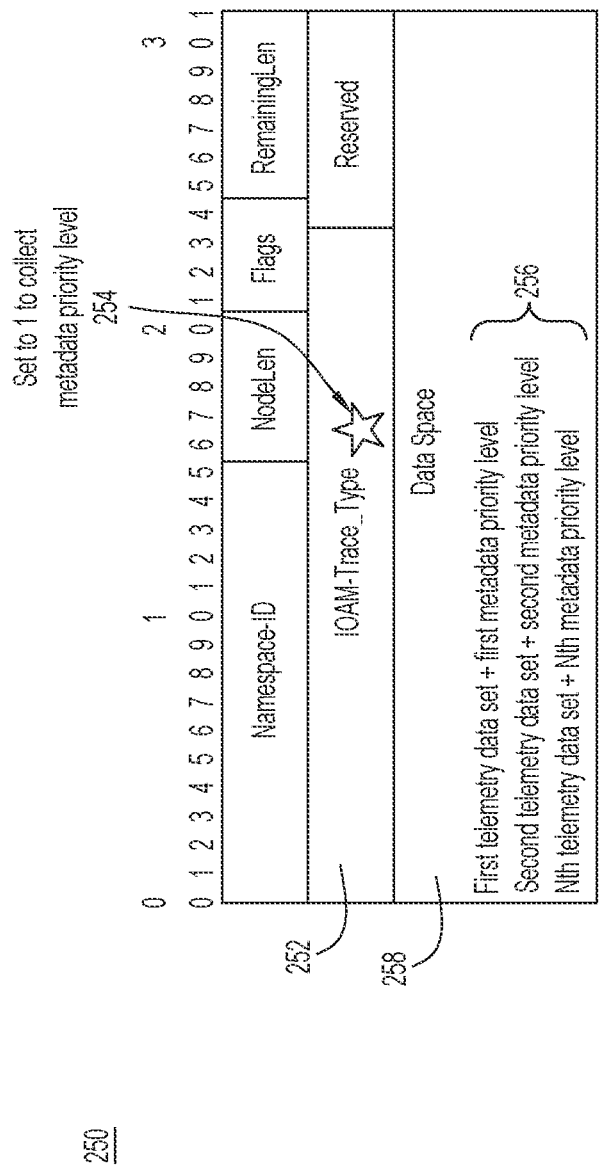

With continued reference to FIG. 1, FIGS. 2A and 2B are diagrams illustrating instructions stored in a header 200 or 250, respectively, of a packet for indicating whether to set the metadata priority level, according to example embodiments. The network source device 110a of FIG. 1 is configured to encapsulate the incoming packet 132 and insert the header 200 or 250 (metadata header) that includes various fields. The network source device 110a inputs instructions to the header 200 or 250 indicating whether to set the metadata priority level prior to the packet 132 being obtained by the first intermediate network device 110b or the second intermediate network device 110c.

Specifically, the header 200 shown in FIG. 2A is an INT metadata header that includes an instruction bitmap 202. In one example, the instruction bitmap 202 is 16-bits long and directs each network device as to what metadata or telemetry data to collect, such as egress related information (timestamps), ingress related information, congestion related values (capacity) in a storage buffer, etc. For this purpose, Bits 0, 1, 2, 3, 4, 5, 6, 7, 8 and 15 of the instruction bitmap 202 are used. An unused bit 204, such as Bit-14, is set to indicate whether the network devices 110a-110n are to add the metadata priority level into the header. When the unused bit 204 is set to 1, for example, this indicates to a respective network device along a path of a network, to determine and add a metadata priority level to the metadata (for its telemetry data set). The network devices 110a-110n along the path of the network add their respective telemetry data sets 206 with the metadata priority level 208 to form an INT metadata stack. That is, each hop or each network device along the path inserts a respective metadata length (hop ML), the respective telemetry data set (4 bytes of metadata that includes the metadata priority level 208).

The header 250 shown in FIG. 2B is an IOAM metadata header that includes an IOAM-Trace-type 252. In one example, the IOAM-Trace-type 252 is 24-bit long and directs each network device as to what metadata to collect. For this purpose, Bits 0, 1, 2, 3, 4, 5, 6, 7, 8, 9, 10, 11, 22, and 23 of the IOAM-Trace-type 252 are used. An unused bit 254 such as Bit-14, is set to indicate whether the network devices 110a-n are to indicate the metadata priority level. When the unused bit 254 is set to 1, for example, this indicates to a respective network device along the path of the network that a metadata priority level needs to be determined and added to the IOAM tracing data. The telemetry data sets 256, with their respective metadata priority levels, are added to a data space 258 of the packet. For example, the telemetry data sets 256 include a first telemetry data set with a first metadata priority level, a second telemetry data set with a second metadata priority level, and an nth telemetry data set with an nth metadata priority level.

In yet another example embodiment, the network controller 122 may configure each of the network devices 110a-110n with types of telemetry data to collect and whether to set the metadata priority level and optionally, a value for the metadata priority level. For example, based on low quality of service (QoS) experienced at a particular network device, the network controller 122 may set the metadata priority level of this network device to high so as to quickly determine the root of the problem.

These are but some non-limiting example embodiments of instructing the network devices 110a-110n to set the metadata priority level. In one or more example embodiments, the network source device 110a may input, to the header 200 or 250 of the packet 132, instructions indicating whether to set the metadata priority level. The instructions are input by the network source device prior to transmitting the packet 132 to one or more transit or intermediate network devices.

Figure 3:
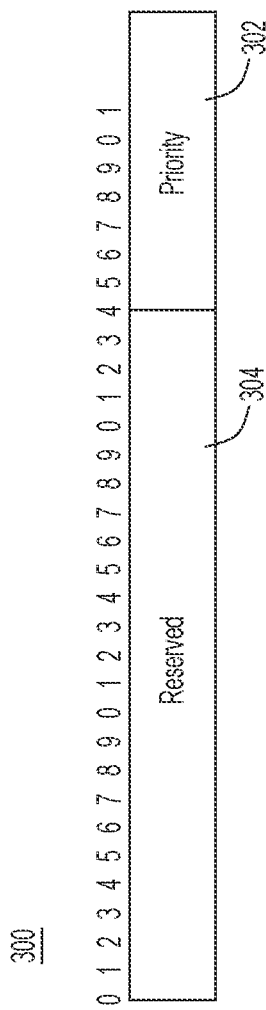
FIG. 3 is a diagram illustrating a metadata priority level field in metadata of a packet, according to an example embodiment.

With continued reference to FIGS. 1, 2A, and 2B, reference is now made to FIG. 3 that illustrates metadata 300 of a packet that includes a metadata priority level field 302, according to an example embodiment. That is, each of the telemetry data sets includes the metadata priority level field 302, such as an 8-bit (LSB) value. Reserved bits 304 are unused and generally set to 0's. A network device may add any metadata priority level value to the respective telemetry data set (to the metadata or IOAM tracing data) in the metadata priority level field 302.

In one example embodiment, seven levels of priority are defined and generated based on various attributes of the network device, its links, and/or packet flow.

| Priority Level | Value |
| --- | --- |
| LEVEL_1 | 1 ---> Least Priority |
| LEVEL_2 | 2 |
| LEVEL_3 | 3 |

-continued

| Priority Level | Value |
| --- | --- |
| LEVEL_4 | 4 |
| LEVEL_5 | 5 |
| LEVEL_6 | 6 |
| LEVEL_7 | 7 ---> Highest Priority |

In one example, any network device that lacks a mechanism to determine its metadata priority level, sets it to least priority of LEVEL_1 only. In another example, the metadata priority level may be communicated from the network controller 122 or an external device such as the telemetry collector 120 of FIG. 1. For example, if the telemetry collector 120 detects a problem or congestion at the first intermediate network device 110b of FIG. 1, it may configure the metadata priority level of the first intermediate network device 110b to 7 to determine the cause of the problem.

In one example embodiment, each network device is pre-configured with a default metadata priority level of LEVEL_1. When a certain event is detected at a network device, the event is analyzed, and the metadata priority level is adjusted (increased). When the problem is resolved, the metadata priority level is again adjusted (reconfigured back to LEVEL_1) at this network device or with a help of an external device (the network controller 122).

Figure 4:
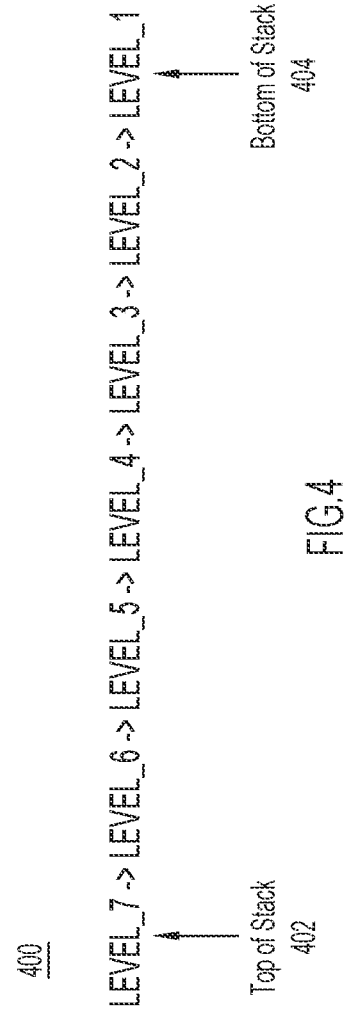
FIG. 4 is a diagram illustrating reordering of telemetry data sets in aggregated metadata, according to an example embodiment.

With continued reference to FIG. 1, reference is now made to FIG. 4 that shows a diagram illustrating reordering 400 of telemetry data sets in aggregated metadata, according to an example embodiment.

The network devices 110a-110n along the path add metadata and a respective metadata priority level indicating urgency and/or important of this metadata. When the network sink device 110n receives the packet 132, the network sink device 110n analyzes the aggregated metadata 138, including the metadata priority levels 142a-142c to generate the export packet 158.

Specifically, the network sink device 110n considers the metadata priority level 142a-142c of the extracted telemetry data sets 140a-140c while forming the export packet 158. The network sink device 110n reorders the telemetry data sets 140a-140c based on the metadata priority levels 142a-142c such that the telemetry data set with highest metadata priority level is placed on top of the stack 402 and the telemetry data set with the lowest metadata priority level is placed on the bottom of the stack 404. Placing higher level priority metadata towards the top of the stack 402 allows the telemetry collector 120 to improve its response time for that particular network device.

For example, aggregated metadata may include a first telemetry data set added by a first network node of the plurality of network nodes and a corresponding first metadata priority level set by the first network node and a second telemetry data set added by a second network node of the plurality of network nodes and a corresponding second metadata priority level set by the second network node. The network sink device 110n determines that the corresponding second metadata priority level is higher than the corresponding first metadata priority level and generates the export packet 158 in which the second telemetry data set is sequentially ordered before the first telemetry data set.

In various example embodiments, the network nodes may be configured to set different metadata priority levels depending on one or more attributes of the network traffic, attributes of a respective network device and its links, attributes of the traffic flow, etc. A change in a state of a respective network device or a change in a state of one or more links associated with the respective network device may trigger adjusting the metadata priority level from a default metadata priority level value (LEVEL_1) to a higher priority level value. In one example embodiment, there are two categories of priority generation events: per-node metadata priority level generation and per-flow metadata priority level generation.

Figure 5A:
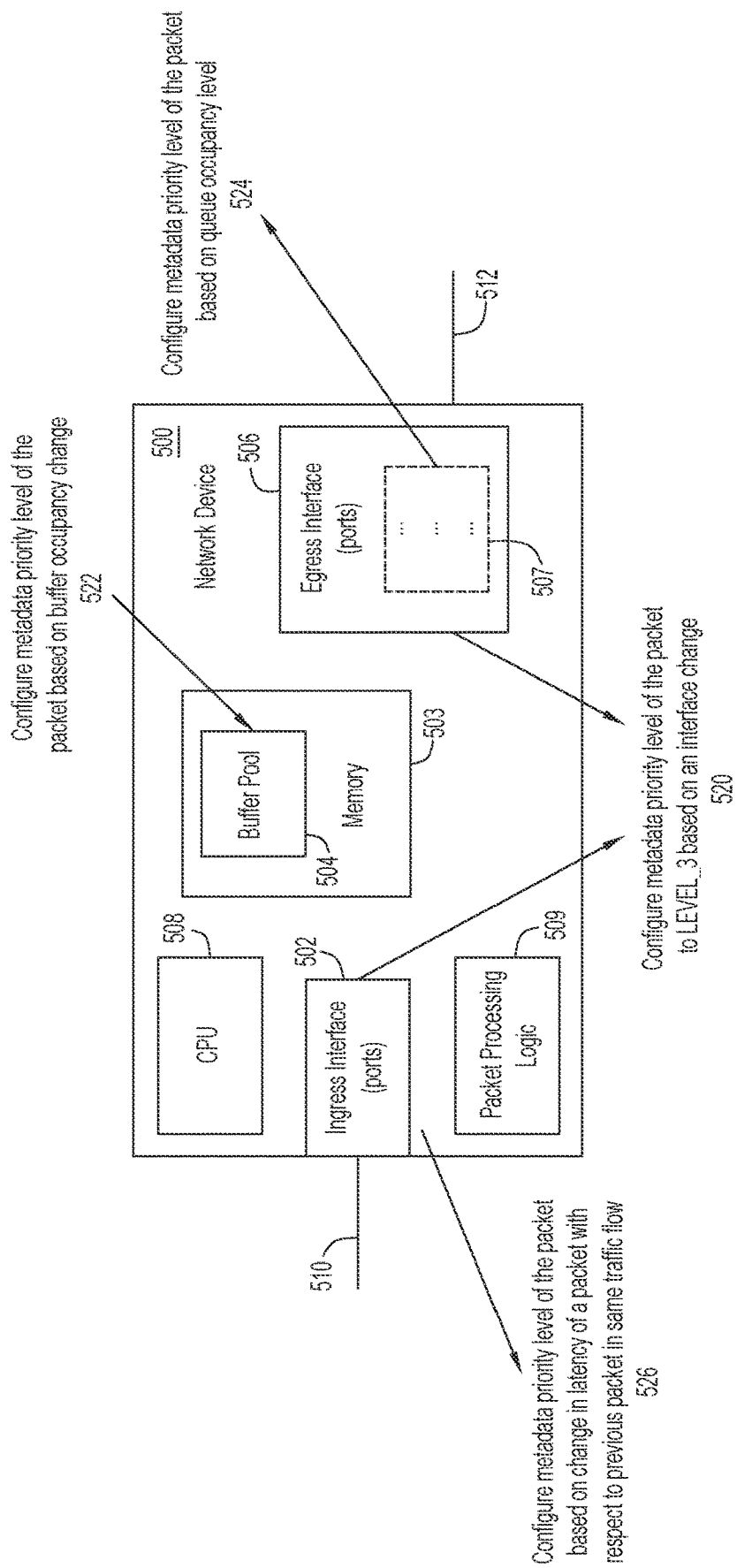
FIGS. 5A and 5B are diagrams illustrating generation of metadata priority levels based on various changes in the state of the network device, its links and other attributes of a traffic flow, according to various example embodiments.

With continued reference to FIG. 1, FIG. 5A illustrates generation of metadata priority levels based on various changes in the state of the network device 500 or its links, according to an example embodiment.

The network device 500 includes an ingress interface 502, a memory 503 that includes a buffer pool 504, and an egress interface 506 with an interface queue 507, a CPU 508, and a packet processing logic 509.

The ingress interface 502 (one or more ports) and is configured to receive packets of various traffic flows and place them in the buffer pool 504 for processing. The buffer pool 504 may include one or more buffers (in hardware memory 503) that store the packets while various lookup operations and processing are performed at the network device 500. When the processing is completed, the packets are placed in an interface queue 507 associated with the egress interface 506. The egress interface 506 (one or more ports) and is configured to transmit the packets to their next hop or the destination. The ingress interface 502 and the egress interface 506 are ports at which the network device 500 receives packets from the network and sends packets into the network.

The memory 503 may include read only memory (ROM) of any type now known or hereinafter developed, random access memory (RAM) of any type now known or hereinafter developed, magnetic disk storage media devices, tamper-proof storage, optical storage media devices, flash memory devices, electrical, optical, or other physical/tangible memory storage devices. In general, the memory 503 may comprise one or more tangible (non-transitory) computer readable storage media (e.g., a memory device) encoded with software comprising computer executable instructions and when the software is executed (by the CPU 508) it is operable to perform certain network device operations described herein. That is, the memory 503 stores various instructions that are to be performed by the CPU 508.

The CPU 508 executes instructions associated with software stored in memory 503. Specifically, the memory 503 stores instructions for control logic that, when executed by the CPU 508, causes the CPU 508 to perform various operations on behalf of the network device 500 as described herein. The memory 503 may also store configuration information received from the network controller 122 to configure the network device 500 according to desired network functions. It should be noted that in some example embodiments, the control logic may be implemented in the form of firmware implemented by one or more ASICs. In some example embodiments, the CPU 508 may be a microprocessor or a microcontroller.

The packet processing logic 509 is representative of packet processing components in the network device 500 such as switch tables, switch fabric that operate to determine whether to drop, forward (and via a particular egress port), switch, etc. a particular packet based on contents of the header of the packet. The packet processing logic 509 may be implemented by one or more Application Specific Integrated Circuits (ASICs), etc.

Conditions at the ingress interface 502 and the egress interface 506 may indicate the state of the ingress link 510 and egress link 512 associated with the network device 500. Conditions (storage capacity) at the buffer pool 504 are indicative of the processing load experienced by the network device 500. These per-node events trigger changes in the metadata priority level for the packet that traverses the network device 500. That is, changes in the state of the network device 500 and/or one or more of its links, e.g., the ingress link 510 and the egress link 512, include interface changes and/or buffer and queue occupancy changes, as detailed below. For these per-node events, the generated metadata priority level is the same for all the monitored traffic flows of the network device 500. While the default metadata priority level may be set to LEVEL_1, these per-node events may trigger an increase in the metadata priority level (adjusted to LEVEL_3 for example).

Specifically, a change in the ingress interface 502 and/or the egress interface 506 may trigger an increase in the metadata priority level. That is, if a change in either the ingress interface 502 or the egress interface 506 for a network packet from a previous network packet of the same flow is detected, then this may be indicative of a topological change at the network device 500 and this topological change needs to be reported to the telemetry collector 120 in a timely manner. Since the change of the interface impacts multiple traffic flows passing the interface, it is treated as node level priority generation event.

In one example embodiment, the network device 500 is configured to select LEVEL_3 as a default metadata priority level for an interface change as shown at 520. The default metadata priority level for the interface change may further be increased or decreased based on additional attributes such as incoming Class of Service (CoS) value of the network packet or the service-level agreement (SLA) of the network packet, explained in detail in FIG. 5B. The same interface change may result in different metadata priority levels being set based on additional factors or attributes.

Another example of a node-related event that triggers a change in the metadata priority level is buffer occupancy changes in the buffer pool 504, as shown at 522. The buffer occupancy change is indicative of the processing load at the network device 500 such that an increase in the buffer occupancy indicates an impending congestion and needs to be reported to the telemetry collector 120 in a timely manner i.e., with an increased metadata priority level.

For example, for every 14% increase in the buffer occupancy from its previous network packet, the metadata priority level may be increased by a preset value (one level) and for every 14% decrease, the metadata priority level may be decreased from a current value. The metadata priority level for a packet when compared with the previous packet may be set based on occupancy change in the buffer pool 504 as follows:

Current packet buffer occupancy is up by 0%-14%→LEVEL_1
Current packet buffer occupancy is up by 15%-28%→LEVEL_2
Current packet buffer occupancy is up by 29%-42%→LEVEL_3
Current packet buffer occupancy is up by 43%-56%→LEVEL_4
Current packet buffer occupancy is up by 57%-70%→LEVEL_5
Current packet buffer occupancy is up by 71%-84%→LEVEL_6
Current packet buffer occupancy is up by 85%-100%→LEVEL_7

Yet another example of a node-related event that may increase the metadata priority level is queue occupancy level as shown at 524. Any increase in the queue occupancy level of the interface queue 507 may be reported with higher metadata priority level because this may indicate congestion at a peer network device. For example, for every 14% increase in queue occupancy level from its previous network packet, the metadata priority level may be increased by a predetermined value and for every 14% decrease, the metadata priority level may be decreased from a current value, as follows:

Current packet queue occupancy is up by 0%-14%→LEVEL_1
Current packet queue occupancy is up by 15%-28%→LEVEL_2
Current packet queue occupancy is up by 29%-42%→LEVEL_3
Current packet queue occupancy is up by 43%-56%→LEVEL_4
Current packet queue occupancy is up by 57%-70%→LEVEL_5
Current packet queue occupancy is up by 71%-84%→LEVEL_6
Current packet queue occupancy is up by 85%-100%→LEVEL_7

When the network device 500 experiences multiple node-related events, the highest metadata priority level may be selected in one non-limiting example.

For the second category of priority generation events (per-flow metadata priority level generation), the metadata priority levels are different for all the monitored traffic flows of the network device 500. Some traffic flow events that trigger per-flow level priority generation include latency and transmission rate. That is, the network device 500 may configure the metadata priority level of the packet based on a change in latency of the packet with respect to a previous packet in the same traffic flow or transmission rate changes of the packets in the same traffic flow as shown at 526. If there is a change in latency of a network packet for a particular traffic flow when compared to the previous network packet of the same traffic flow, the network device 500 may report this event to the telemetry collector 120 in a timely manner by setting a different metadata priority level. The more significant the change in latency, the higher the metadata priority level may be set. For example, for every 14% increase in latency from the previous network packet, the metadata priority level is increased by a predetermined value and for every 14% decrease, the metadata priority level may be decreased from a current value, as follows:

Current packet latency is up by 0%-14%→LEVEL_1
Current packet latency is up by 15%-28%→LEVEL_2
Current packet latency is up by 29%-42%→LEVEL_3
Current packet latency is up by 43%-56%→LEVEL_4
Current packet latency is up by 57%-70%→LEVEL_5
Current packet latency is up by 71%-84%→LEVEL_6
Current packet latency is up by 85%-100%→LEVEL_7

The metadata priority level is adjusted based on packet latency or transmission rate changes of various packets in the same traffic flow.

Additionally, other factors or attributes may further be considered in setting the metadata priority level. For example, same event may result in different metadata priority level being set based on a service level of a traffic flow, attributes of a source device, the particular network node, link, etc.

Figure 5B:
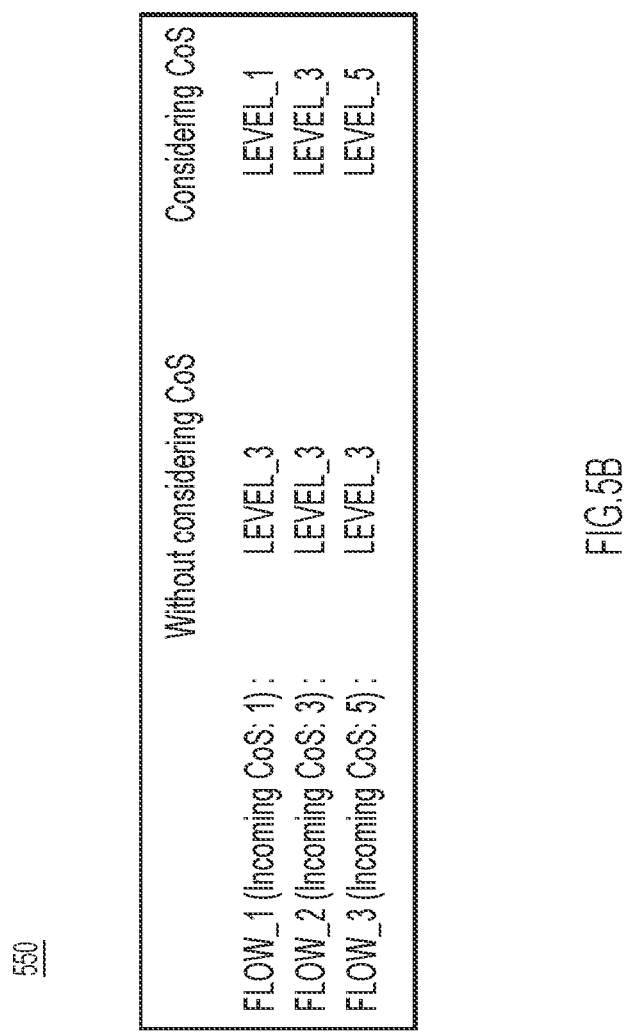

Reference is now made to FIG. 5B with continued reference to FIGS. 1 and 5A. FIG. 5B shows a diagram illustrating metadata priority levels 550 generated with and without considering CoS, according to an example embodiment.

When CoS is not considered, interface changes may trigger the network device 500 to set the metadata priority level to LEVEL_3, for example, but when CoS is considered, the metadata priority level is adjusted based on the CoS value. That is, the network device 500 considers its incoming CoS value as another factor for calculating the metadata priority level. This allows the network device 500 to further classify each flow into different metadata priority levels for the same event impacting multiple flows. For example, the network device 500 has an interface change (a change of the egress interface 506) that impacts three different flows: FLOW_1, FLOW_2, and FLOW_3. Based on the CoS values assigned to each traffic flow, the network device 500 sets different metadata priority levels to the telemetry data set of the packets of each traffic flow. Based on the CoS value of the incoming packet, the metadata priority level LEVEL_3 is decreased, stays the same, or is increased.

Techniques herein provide a mechanism to categorize and filter metadata of network devices by adding a metadata priority level field to the metadata, obtained as part of in-band network telemetry data collection. Additionally, the techniques provide a mechanism for reordering, at a network sink device, aggregated metadata that includes various telemetry data sets based on their respective metadata priority levels.

Using the metadata prioritization allows the telemetry collector to reduce the response time for the network device that needs it most. Improve SLA for a network device using the metadata prioritization. For example, if three different enterprise network device have different SLA requirements, then each network device receives telemetry collector service based on their metadata node prioritization level. The telemetry collector renders different services to different flows by classifying each of these flows to different metadata priority levels for the same node-related or flow-related event.

Figure 6:
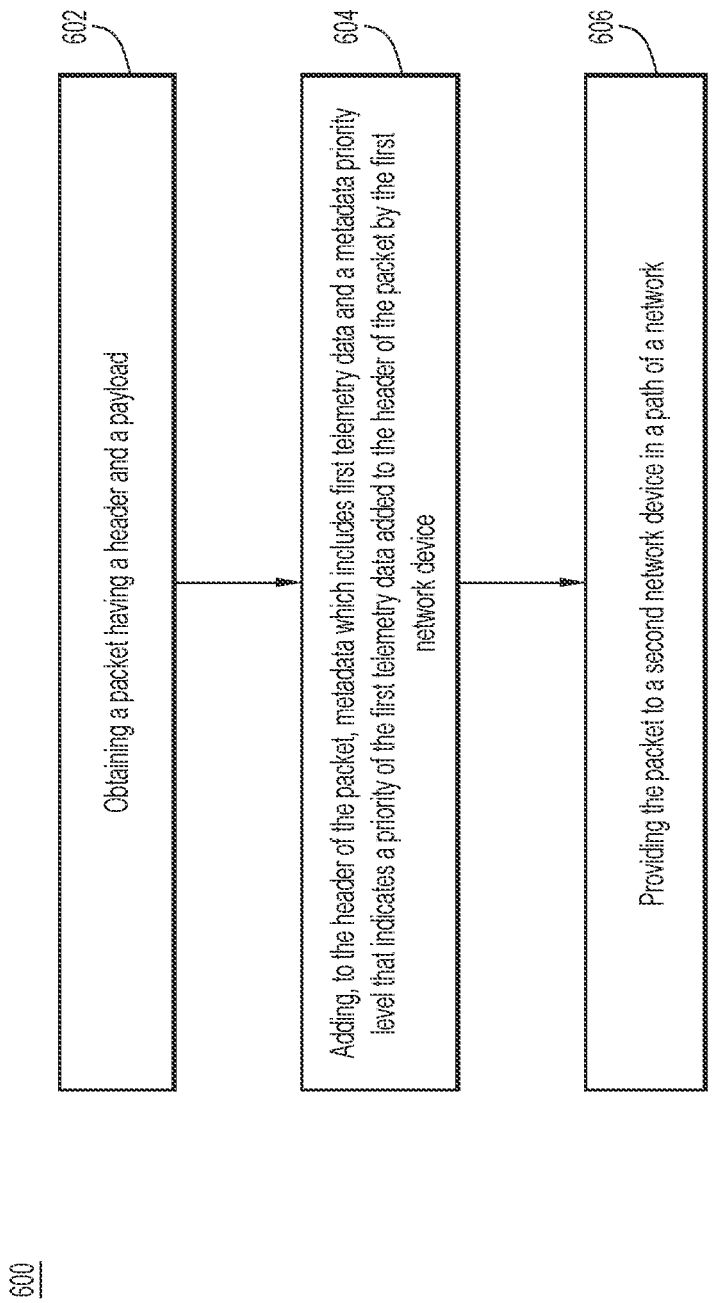
FIG. 6 is a flow diagram illustrating a method of adding a metadata priority field to a node metadata, according to an example embodiment.

FIG. 6 is a flowchart illustrating a method of 600 of adding a metadata priority field to metadata of a network device, according to an example embodiment. The method 600 may be performed by any of the network devices 110a-n.

The method 600 involves, at 602, obtaining a packet having a header and a payload. The method 600 further involves, at 604, adding to the header of the packet, metadata which includes first telemetry data and a metadata priority level that indicates a priority of the first telemetry data added to the header of the packet by the first network device. The method 600 further includes, at 606, providing the packet to a second network device in a path of a network.

In one instance, the method 600 may further involve the second network device adding, to the header of the packet, second telemetry data and another metadata priority level that indicates the priority of the second telemetry data added to the header of the packet by the second network device.

In one or more example embodiments, the method 600 may further involve the first network device collecting the first telemetry data and setting the metadata priority level for the first telemetry data based on one or more instructions obtained by the first network device from the header of the packet. The one or more instructions may be input into the header of the packet by a source network device prior to obtaining the packet by the first network device.

In one form, the one or more instructions may be stored in an in-band network telemetry (INT) bitmap in the header of the packet and the INT bitmap may include a field for indicating whether to set the metadata priority level.

In another form, the one or more instructions may be stored in an in-situ operation, administration, and maintenance (TOM) trace type option of the header of the packet and the TOM trace type option may include a field for indicating whether to set the metadata priority level.

In one or more example embodiments, the method 600 may further involve the first network device determining a change in at least one of a state of the first network device or one or more links associated with the first network device and setting the metadata priority level based on the change.

In one instance, the operation of setting the metadata priority level may include decreasing or increasing the metadata priority level from a default metadata priority level based on one or more attributes of the change in the at least one of the state of the first network device or the one or more links associated with the first network device.

In one form, the change may include one or more of: traffic rate change at an ingress interface of the first network device, the traffic rate change at an egress interface of the first network device, an occupancy change at a buffer of the first network device that is configured to store a plurality of packets while a lookup operation is performed, or the occupancy change at an egress queue of the first network device that is configured to store the plurality of packets that are to be transmitted from the first network device on the path in the network.

In another form, the change may include a transmission rate change specific to a traffic flow of the packet.

In one or more example embodiments, the transmission rate change specific to the traffic flow of the packet may include a change in latency of the packet for the traffic flow compared to a previous packet of the traffic flow.

In one or more example embodiments, the method 600 may further involve determining a service level of a traffic flow that includes the packet and adjusting the metadata priority level based on the service level of the traffic flow such that different metadata priority levels are set for a same change of different service levels traffic flows.

Figure 7:
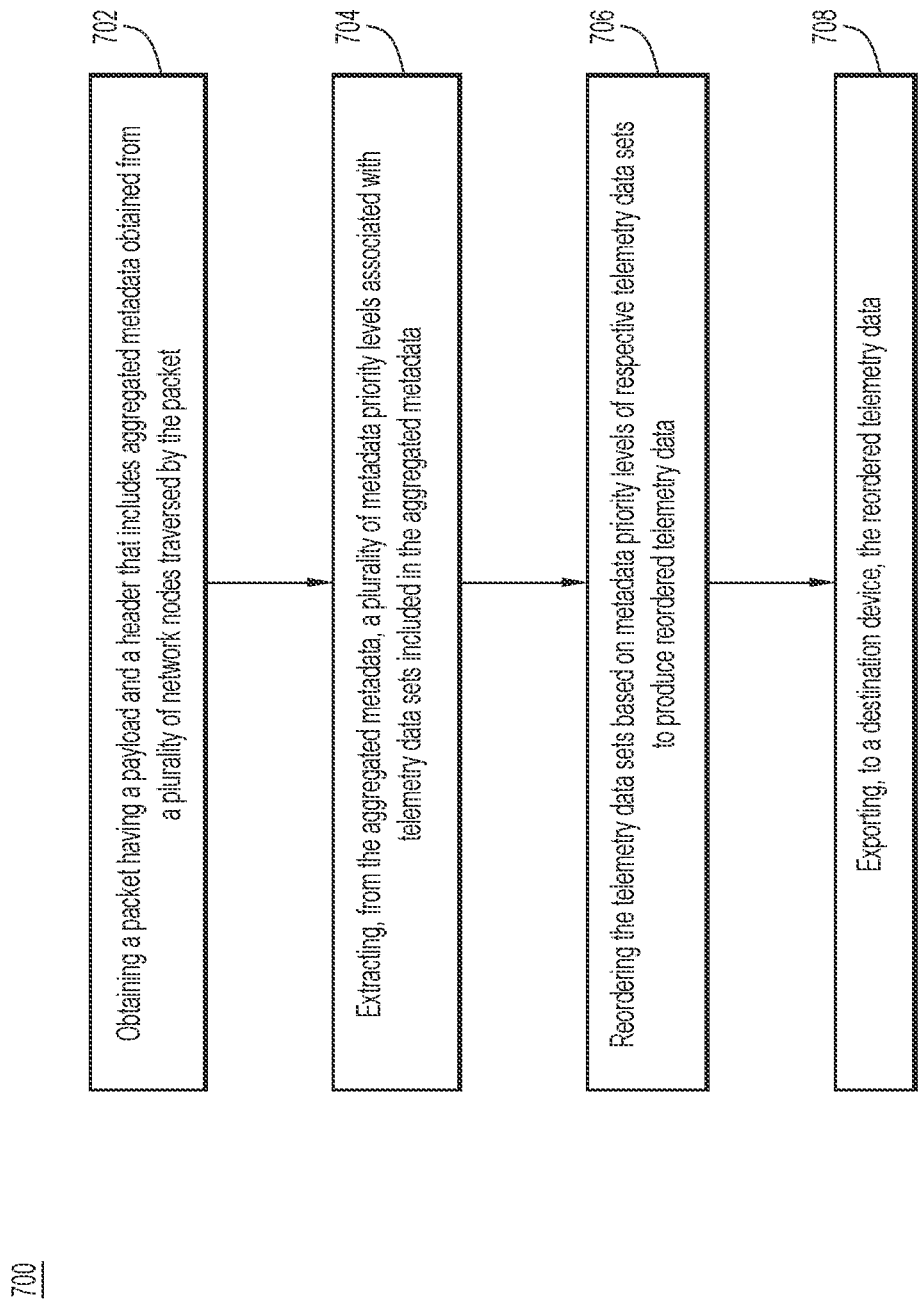
FIG. 7 is a flow diagram illustrating a method of reordering telemetry data sets in aggregated metadata based on respective metadata priority levels, according to an example embodiment.

FIG. 7 is a flowchart illustrating a method of 700 of reordering telemetry data sets in aggregated metadata based on respective metadata priority levels, according to an example embodiment. The method 700 is performed by a network device, such as the network sink device 110n shown in FIG. 1.

The method 700 involves at 702, obtaining a packet having a payload and a header that includes aggregated metadata obtained from a plurality of network nodes traversed by the packet.

The method 700 further involves at 704, extracting, from the aggregated metadata, a plurality of metadata priority levels associated with telemetry data sets included in the aggregated metadata.

The method 700 further involves at 706, reordering the telemetry data sets based on metadata priority levels of respective telemetry data sets to produce reordered telemetry data and at 708, exporting, to a destination device, the reordered telemetry data.

In one or more example embodiments, the aggregated metadata may include a first telemetry data set added by a first network node of the plurality of network nodes and a corresponding first metadata priority level set by the first network node and a second telemetry data set added by a second network node of the plurality of network nodes and a corresponding second metadata priority level set by the second network node. The method 700 may further involve determining that the second metadata priority level is higher than the first metadata priority level and generating an export packet in which the second telemetry data set is sequentially ordered before the first telemetry data set.

In one instance, the metadata priority levels may be indicative of one or more transmission rate related changes at a respective network node or on a per traffic flow basis.

In one form, the header may include an in-situ operation, administration, and maintenance (IOM) header or an in-band network telemetry (INT) header, and the header may store the aggregated metadata having traffic related information aggregated in order of collection from each network node along a path in a network traversed by the packet.

Figure 8:
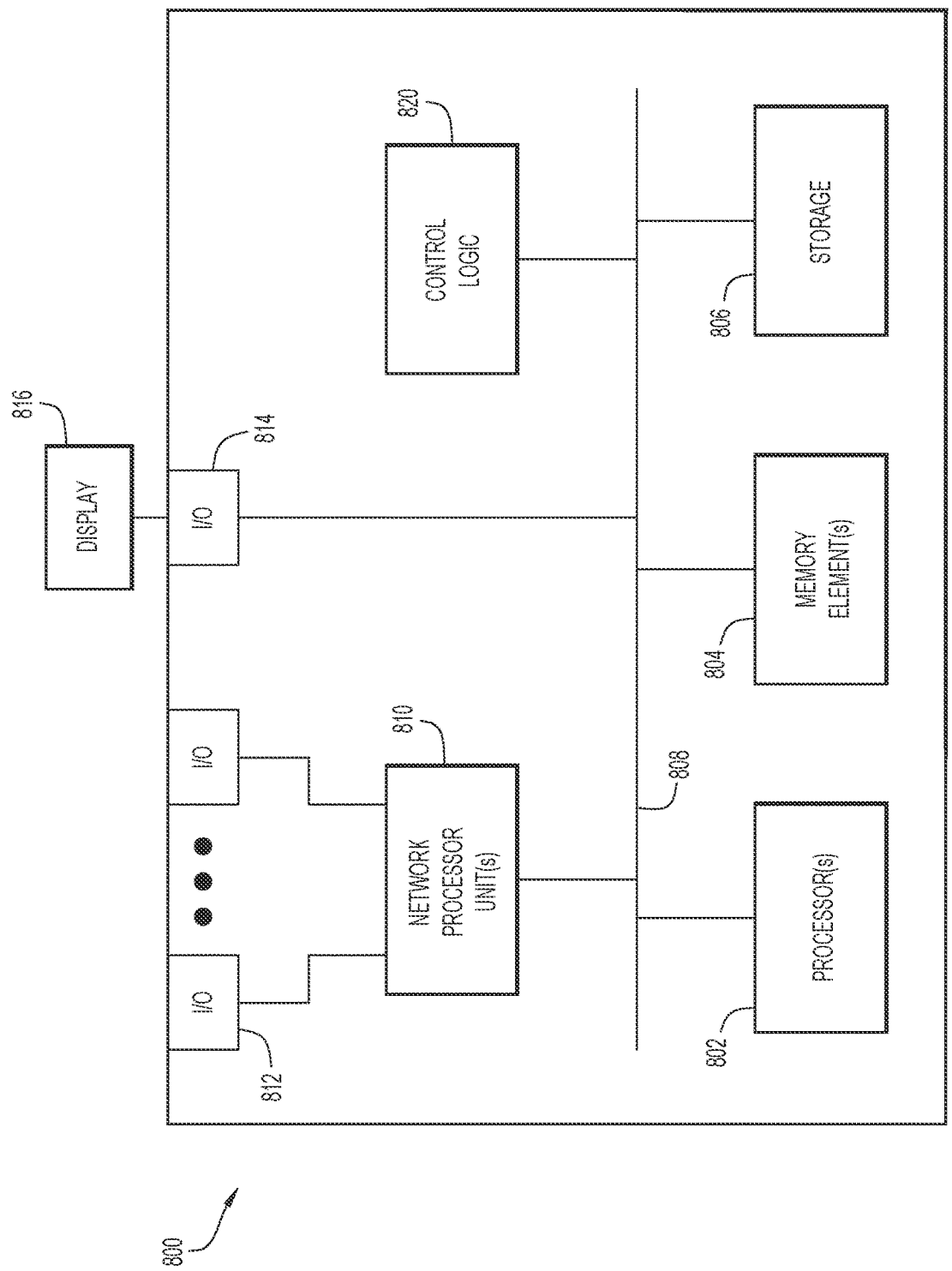
FIG. 8 is a hardware block diagram of a computing device that may perform functions associated with any combination of operations in connection with the techniques depicted and described in FIGS. 1-7, according to various example embodiments.

FIG. 8 is a hardware block diagram of a computing device 800 that may perform functions associated with any combination of operations in connection with the techniques depicted in FIGS. 1-7, according to various example embodiments, including, but not limited to, operations of the one or more network devices 110*a-n* of FIG. 1. Further, the computing device 800 may be representative of one of the data source device 102, the data sink device 104, the telemetry collector 120, or the network controller 122 of FIG. 1. It should be appreciated that FIG. 8 provides only an illustration of one example embodiment and does not imply any limitations with regard to the environments in which different example embodiments may be implemented. Many modifications to the depicted environment may be made.

In at least one embodiment, computing device 800 may include one or more processor(s) 802, one or more memory element(s) 804, storage 806, a bus 808, one or more network processor unit(s) 810 interconnected with one or more network input/output (I/O) interface(s) 812, one or more I/O interface(s) 814, and control logic 820. In various embodiments, instructions associated with logic for computing device 800 can overlap in any manner and are not limited to the specific allocation of instructions and/or operations described herein.

In at least one embodiment, processor(s) 802 is/are at least one hardware processor configured to execute various tasks, operations and/or functions for computing device 800 as described herein according to software and/or instructions configured for computing device 800. Processor(s) 802 (e.g., a hardware processor) can execute any type of instructions associated with data to achieve the operations detailed herein. In one example, processor(s) 802 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, one or more memory element(s) 804 and/or storage 806 is/are configured to store data, information, software, and/or instructions associated with computing device 800, and/or logic configured for memory element(s) 804 and/or storage 806. For example, any logic described herein (e.g., control logic 820) can, in various embodiments, be stored for computing device 800 using any combination of memory element(s) 804 and/or storage 806. Note that in some embodiments, storage 806 can be consolidated with one or more memory elements 804 (or vice versa), or can overlap/exist in any other suitable manner.

In at least one embodiment, bus 808 can be configured as an interface that enables one or more elements of computing device 800 to communicate in order to exchange information and/or data. Bus 808 can be implemented with any architecture designed for passing control, data and/or information between processors, memory elements/storage, peripheral devices, and/or any other hardware and/or software components that may be configured for computing device 800. In at least one embodiment, bus 808 may be implemented as a fast kernel-hosted interconnect, potentially using shared memory between processes (e.g., logic), which can enable efficient communication paths between the processes.

In various embodiments, network processor unit(s) 810 may enable communication between computing device 800 and other systems, entities, etc., via network I/O interface(s) 812 to facilitate operations discussed for various embodiments described herein. In various embodiments, network processor unit(s) 810 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 800 and other systems, entities, etc. to facilitate operations for various embodiments described herein. In various embodiments, network I/O interface(s) 812 can be configured as one or more Ethernet port(s), Fibre Channel ports, and/or any other I/O port(s) now known or hereafter developed. Thus, the network processor unit(s) 810 and/or network I/O interface(s) 812 may include suitable interfaces for receiving, transmitting, and/or otherwise communicating data and/or information in a network environment.

I/O interface(s) 814 allow for input and output of data and/or information with other entities that may be connected to computer device 800. For example, I/O interface(s) 814 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor 816, a display screen, or the like.

In various embodiments, control logic 820 can include instructions that, when executed, cause processor(s) 802 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

In another example embodiment, an apparatus is provided. The apparatus includes a plurality of ports each configured to receive and send packets in a network and a processor. The processor is configured to perform various operations including obtaining, from one of the plurality of ports, a packet having a header and a payload and adding to the header of the packet, metadata which includes first telemetry data and a metadata priority level that indicates a priority of the first telemetry data added to the header of the packet by the apparatus. The operations further include providing the packet to another one of the plurality of ports for transmission along a path in the network.

In yet another example embodiment, an apparatus is provided. The apparatus includes a plurality of ports each configured to receive and send packets in a network and a processor. The processor is configured to perform various operations. The operations include obtaining, from one of the plurality of ports, a packet having a payload and a header that includes aggregated metadata obtained from a plurality of network nodes traversed by the packet. The operations further include extracting from the aggregated metadata, a plurality of metadata priority levels associated with telemetry data sets included in the aggregated metadata. The operations further include reordering the telemetry data sets based on metadata priority levels of respective telemetry data sets to produce reordered telemetry data and exporting, via another one of the plurality of ports, to a destination device, the reordered telemetry data.

In yet another example embodiment, one or more non-transitory computer readable storage media encoded with instructions are provided. When the media is executed by a processor, the instructions cause the processor to execute a method that includes obtaining a packet having a header and a payload. The method further includes adding, to the header of the packet, metadata which includes first telemetry data and a metadata priority level that indicates a priority of the first telemetry data added to the header of the packet by the apparatus. The method further includes providing the packet to a network device in a path of a network.

In yet another example embodiment, one or more non-transitory computer readable storage media encoded with instructions are provided. When the media is executed by a processor, the instructions cause the processor to execute another method that involves obtaining a packet having a payload and a header that includes aggregated metadata obtained from a plurality of network nodes traversed by the packet. The method further involves extracting, from the aggregated metadata, a plurality of metadata priority levels associated with telemetry data sets included in the aggregated metadata. The method further includes reordering the telemetry data sets based on metadata priority levels of respective telemetry data sets to produce reordered telemetry data and exporting, to a destination device, the reordered telemetry data.

In yet another example embodiment, a system is provided that includes the devices and operations explained above with reference to FIGS. 1-8.

The programs described herein (e.g., control logic 820) may be identified based upon the application(s) for which they are implemented in a specific embodiment. However, it should be appreciated that any particular program nomenclature herein is used merely for convenience, and thus the embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, the storage 806 and/or memory elements(s) 804 can store data, software, code, instructions (e.g., processor instructions), logic, parameters, combinations thereof, and/or the like used for operations described herein. This includes the storage 806 and/or memory elements(s) 804 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio- Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein, the terms may be used in a generic sense to include packets, frames, segments, datagrams, and/or any other generic units that may be used to transmit communications in a network environment. Generally, the terms reference to a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data, or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of,' one or more of, 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
obtaining, by a first network device, a packet having a header and a payload;
determining whether to set a metadata priority level for first telemetry data based on one or more instructions in the header of the packet;
adding, by the first network device, to the header of the packet, metadata which includes the first telemetry data and the metadata priority level that indicates a priority of the first telemetry data added to the header of the packet by the first network device based on determining to set the metadata priority level; and
providing the packet to a second network device in a path of a network.

2. The method of claim 1, further comprising:
adding, by the second network device, to the header of the packet, second telemetry data and another metadata priority level that indicates the priority of the second telemetry data added to the header of the packet by the second network device.

3. The method of claim 1, further comprising:
collecting, by the first network device, the first telemetry data; and
setting the metadata priority level for the first telemetry data based on the one or more instructions obtained by the first network device from the header of the packet, wherein the one or more instructions are input into the header of the packet by a source network device prior to obtaining the packet by the first network device.

4. The method of claim 3, wherein the one or more instructions are stored in an in-band network telemetry (INT) bitmap in the header of the packet and the INT bitmap includes a field for indicating whether to set the metadata priority level.

5. The method of claim 3, wherein the one or more instructions are stored in an in-situ operation, administration, and maintenance (IOM) trace type option of the header of the packet and the IOM trace type option includes a field for indicating whether to set the metadata priority level.

6. The method of claim 1, further comprising:
determining, by the first network device, a change in at least one of a state of the first network device or one or more links associated with the first network device; and
setting the metadata priority level based on the change.

7. The method of claim 6, wherein setting the metadata priority level includes:
decreasing or increasing the metadata priority level from a default metadata priority level based on one or more attributes of the change in the at least one of the state of the first network device or the one or more links associated with the first network device.

8. The method of claim 6, wherein the change includes one or more of:
traffic rate change at an ingress interface of the first network device,
the traffic rate change at an egress interface of the first network device,
an occupancy change at a buffer of the first network device that is configured to store a plurality of packets while a lookup operation is performed, or
the occupancy change at an egress queue of the first network device that is configured to store the plurality of packets that are to be transmitted from the first network device on the path in the network.

9. The method of claim 6, wherein the change includes a transmission rate change specific to a traffic flow of the packet.

10. The method of claim 9, wherein the transmission rate change specific to the traffic flow of the packet includes a change in latency of the packet for the traffic flow compared to a previous packet of the traffic flow.

11. The method of claim 1, further comprising:
determining a service level of a traffic flow that includes the packet; and
adjusting the metadata priority level based on the service level of the traffic flow such that different metadata priority levels are set for a same change of different service levels traffic flows.

12. An apparatus comprising:
a plurality of ports each configured to receive and send packets in a network; and
a processor, wherein the processor is configured to perform operations comprising:
obtaining, from one of the plurality of ports, a packet having a header and a payload;
determining whether to set a metadata priority level for first telemetry data based on one or more instructions in the header of the packet;
adding to the header of the packet, metadata which includes the first telemetry data and the metadata priority level that indicates a priority of the first telemetry data added to the header of the packet by the apparatus based on determining to set the metadata priority level; and
providing the packet to another one of the plurality of ports for transmission along a path in the network.

13. The apparatus of claim 12, wherein the processor is further configured to perform:
adding, to the header of the packet, second telemetry data and another metadata priority level that indicates the priority of the second telemetry data added to the header of the packet by a network device.

14. The apparatus of claim 12, wherein the processor is further configured to perform:
collecting the first telemetry data; and
setting the metadata priority level for the first telemetry data based on the one or more instructions obtained by the apparatus from the header of the packet, wherein the one or more instructions are input into the header of the packet by a source network device prior to obtaining the packet by the apparatus.

15. The apparatus of claim 14, wherein the one or more instructions are stored in an in-band network telemetry (INT) bitmap in the header of the packet and the INT bitmap includes a field for indicating whether to set the metadata priority level.

16. The apparatus of claim 14, wherein the one or more instructions are stored in an in-situ operation, administration, and maintenance (IOM) trace type option of the header of the packet and the IOM trace type option includes a field for indicating whether to set the metadata priority level.

17. One or more non-transitory computer readable storage media encoded with software comprising computer executable instructions that, when executed by a processor, cause the processor to perform a method including:
obtaining a packet having a header and a payload;
adding to the header of the packet, metadata which includes first telemetry data and a metadata priority level that indicates a priority of the first telemetry data added to the header of the packet by the processor;
providing the packet to a network device for transmission along a path in a network; and
adding, to the header of the packet, second telemetry data and a second metadata priority level that indicates the priority of the second telemetry data added to the header of the packet by the network device.

18. The one or more non-transitory computer readable storage media according to claim 17, wherein the computer executable instructions cause the processor to further perform:
collecting the first telemetry data; and
setting the metadata priority level for the first telemetry data based on one or more instructions obtained by the processor from the header of the packet, wherein the one or more instructions are input into the header of the packet by a source network device prior to obtaining the packet by the processor.

19. The one or more non-transitory computer readable storage media according to claim 18, wherein the one or more instructions are stored in an in-band network telemetry (INT) bitmap in the header of the packet and the INT bitmap includes a field for indicating whether to set the metadata priority level.

20. The one or more non-transitory computer readable storage media according to claim 17, wherein the metadata priority level indicates a priority level of the first telemetry data with respect to other telemetry data collected along the path in the network.

\* \* \* \* \*